US012328359B1

(12) United States Patent
Wali et al.

(10) Patent No.: US 12,328,359 B1
(45) Date of Patent: Jun. 10, 2025

(54) ALLOCATING RESOURCES BASED ON GROUP PERFORMANCE METRICS COMPUTED USING MACHINE LEARNING MODELS

(71) Applicant: Citigroup Inc., New York, NY (US)

(72) Inventors: Girish Wali, Irving, TX (US); Prasanth Babu Madakasira Ramakrishna, Irving, TX (US); Deepali Tuteja, Irving, TX (US); Vaibhav Nagpal, Irving, TX (US)

(73) Assignee: Citigroup Inc., New York, NY (US)

( * ) Notice: Subject to any disclaimer, the term of this patent is extended or adjusted under 35 U.S.C. 154(b) by 0 days.

(21) Appl. No.: 19/047,445

(22) Filed: Feb. 6, 2025

(51) Int. Cl.
*G06F 16/45* (2019.01)
*H04L 47/24* (2022.01)
*H04L 67/1008* (2022.01)
*H04L 67/1029* (2022.01)

(52) U.S. Cl.
CPC .......... *H04L 67/1008* (2013.01); *G06F 16/45* (2019.01); *H04L 47/24* (2013.01); *H04L 67/1029* (2013.01)

(58) Field of Classification Search
CPC . H04L 67/1008; H04L 47/24; H04L 67/1029; G06F 16/45
See application file for complete search history.

(56) References Cited

U.S. PATENT DOCUMENTS

| | | | | |
|---|---|---|---|---|
| 10,225,365 | B1 * | 3/2019 | Hotchkies | H04L 67/568 |
| 10,963,296 | B1 * | 3/2021 | Bannert | G06F 9/5083 |
| 11,561,666 | B1 * | 1/2023 | Paramasamy | G06Q 40/03 |
| 12,067,589 | B2 * | 8/2024 | Reedy | G06Q 30/0239 |
| 12,086,721 | B1 * | 9/2024 | Smith | G06N 3/09 |
| 2014/0280208 | A1 * | 9/2014 | McConky | H04L 65/60 707/748 |
| 2021/0390573 | A1 * | 12/2021 | Reedy | G06Q 30/0261 |
| 2022/0067181 | A1 * | 3/2022 | Carley | H04L 9/0618 |

* cited by examiner

*Primary Examiner* — Jorge A Casanova
(74) *Attorney, Agent, or Firm* — Davis Wright Tremaine LLP

(57) ABSTRACT

A plurality of entities is categorized into a plurality of segments based, at least in part, on data on the plurality of entities. A plurality of groups is generated based, at least in part, on similarities between segments of the plurality of segments. A machine learning model is trained to compute group performance metrics for the plurality of groups by at least initializing a weight to an individual segment of the plurality of segments and modifying the weight. A first resource is allocated to a first group of the plurality of groups based, at least in part, on a first group performance metric from the trained machine learning model. An indication of the first resource allocated to the first group is caused to be presented via an interface.

20 Claims, 7 Drawing Sheets

600

ALLOCATING RESOURCES BASED ON GROUP PERFORMANCE METRICS COMPUTED USING MACHINE LEARNING MODELS

BACKGROUND

Allocating resources to an appropriate group of entities may include a complex process of accurately categorizing these entities, each defined by a unique set of dynamic data points. These data points, such as demographic information, financial activities, and personal preferences, may indicate diverse features that characterize each segment. The complexity can arise from the necessity of effectively evaluating these groups, especially as the data evolves continuously, reflecting shifting patterns of behavior. Without a system that can integrate and analyze real-time data to update segmentation strategies and ensure precise resource allocation, inefficiencies and missed opportunities may arise, preventing resources from being directed to the right group of entities.

BRIEF DESCRIPTION OF THE DRAWINGS

Various techniques will be described with reference to the drawings, in which.

SUMMARY

Figure 1:
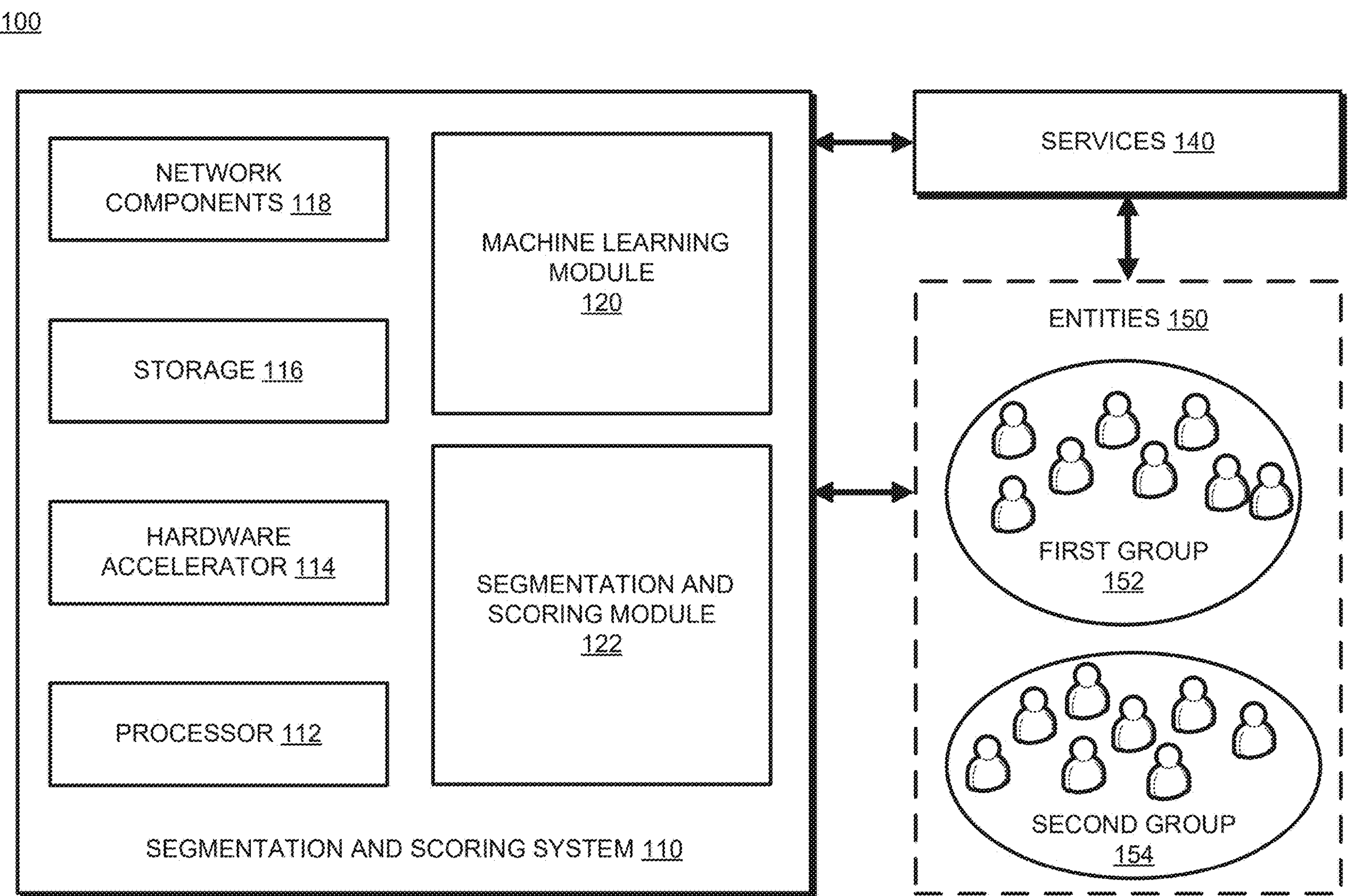
FIG. 1 illustrates an example of a system to perform group scoring, in accordance with an embodiment.

According to one example of the present application, a system can be configured to perform particular operations or actions using software, firmware, hardware, or a combination of them installed on the system that in operation causes or cause the system to perform group segmentation and scoring. For example, the system can perform a method that includes receiving data of a plurality of entities (e.g., activity data). The method can further include identifying a set of features of the plurality of entities based, at least in part, on the data. The method can further include categorizing the plurality of entities into a plurality of segments based, at least in part, on the set of features. The method can further include grouping the plurality of segments into a plurality of groups based, at least in part, on similarities between segments of the plurality of segments. The method can further include training a machine learning model by at least initializing a weight to an individual segment of the plurality of segments and modifying the weight in an iterative training process to train a machine learning model that computes group performance metrics for the plurality of groups. The method can further include causing the trained machine learning model to compute a first group performance metric for a first group of the plurality of groups. The method can further include allocating a first resource to the first group of the plurality of groups based, at least in part, on the first group performance metric. The method can further include causing a comparison between the first resource allocated to the first group and a second resource allocated to a second group of the plurality of groups to be displayed in a user interface. The method can further include includes re-categorizing the plurality of entities and causing the trained machine learning model to re-compute group performance metrics based, at least in part, on additional data or data to be changed. The method can further include re-allocating the first resource based, at least in part, on the re-categorization of the plurality of entities.

Re-allocating the first resource can further include: causing the trained machine learning model to compute a second group performance metric for a third group generated based, at least in part, on the re-categorization of the plurality of entities; and allocating the first resource or a third resource to the third group generated based, at least in part, on the second group performance metric. Training the machine learning model can further include initializing the weight equally for the plurality of segments prior to executing the iterative training process. Training the machine learning model further can further receiving additional data in batches to modify the weight in the iterative training process. Training the machine learning model may further include performing one or more regression algorithms to modify the weight.

The system can further include one or more processors. The system can further include one or more non-transitory, computer-readable media may include instructions recorded thereon that, as a result of execution by the one or more processors, causes the system to at least: obtain data on a plurality of entities; categorize the plurality of entities into a plurality of segments based, at least in part, on the data; generate a plurality of groups based, at least in part, on similarities between segments of the plurality of segments; train a machine learning model that computes group performance metrics for the plurality of groups by at least initializing a weight to an individual segment of the plurality of segments and iteratively modifying the weight; allocate a first resource to a first group of the plurality of groups based, at least in part, on a first group performance metric computed by the trained machine learning model; cause a comparison between the first resource allocated to the first group and a second resource allocated to a second group of the plurality of groups to be displayed in an interface; and re-categorize the plurality of entities and cause the trained machine learning model to re-compute group performance metrics based, at least in part, on additional data or data to be changed.

The system can re-compute group performance metrics by at least: adding a group to the plurality of groups based, at least in part, on the re-categorization of the plurality of entities; and causing the trained machine learning model to compute a second group performance metric for the added group. The system can further allocate a second resource to the first group of the plurality of groups based, at least in part, on the re-computation of the group performance metrics computed by the trained machine learning model. The system can train a machine learning model by at least determining that an initial value for the weight is equal for the plurality of segments prior to performing the iterative training process to train a machine learning model. The system can obtain data on a plurality of entities further includes by at least obtaining the data in batches with an individual batch associated with a time period. The first resource can be selected based, at least in part, on a feature of the first group of the plurality of groups. The system can re-categorize the plurality of entities by at least removing at least one of the plurality of entities from at least one of the plurality of segments based, at least in part, on a determination that the at least one of the plurality of entities is an outlier. The comparison can be displayed in response to a signal (e.g., request) from a computing device associated with at least one of the plurality of entities.

The system can include one or more non-transitory computer-readable storage media storing computer-executable instructions that cause the system to categorize the plurality of entities into a plurality of segments based, at least in part, on the data. The computer-executable instructions can cause the system to generate a plurality of groups based, at least in part, on similarities between segments of the plurality of segments. The computer-executable instructions can cause the system to train a machine learning model by at least initializing a weight to an individual segment of the plurality of segments and modifying the weight in an iterative training process to train a machine learning model that computes group performance metrics for the plurality of groups. The computer-executable instructions can cause the system to allocate a first resource to a first group of the plurality of groups based, at least in part, on a first group performance metric computed by the trained machine learning model. The computer-executable instructions can cause the system to cause information indicating the first resource allocated to the first group and a second resource allocated to a second group of the plurality of groups to be presented to an interface. The computer-executable instructions can cause the system to re-categorize the plurality of entities and cause the trained machine learning model to re-compute group performance metrics based, at least in part, on additional data or data to be changed.

The computer-executable instructions can cause the system to identify a third group of the plurality of groups that is generated as a result of re-categorizing the plurality of entities; and allocating the first resource or a third resource to the third group of the plurality of groups based, at least in part, on re-computing the group performance metrics. The trained machine learning model can be further trained based, at least in part, on the additional data or data to be changed. The information can be provided to a computing device associated with at least one of the plurality of entities in response to a signal from the computing device. The first group performance metric may include a score associated with the first group of the plurality of groups. The computer-executable instructions can cause the system to remove at least one group to the plurality of groups based, at least in part, on the re-categorization of the plurality of entities. The computer-executable instructions can cause the system to identify that an initial value for the weight is identical for the plurality of segments prior to performing the iterative training process to train the machine learning model comprising neural networks. The computer-executable instructions can cause the system to obtain additional data in sequential batches to modify the weight in the iterative training process.

DETAILED DESCRIPTION

Techniques and systems described below relate to group segmentation and scoring using machine learning models. Systems of the present disclosure can group entities, such as customers, into multiple segments based on various data points, including activity data and any other information (e.g., demographic information, credit score, personal preferences, financial obligations). The systems can group these segments into larger groups based on their similarities. For instance, systems can categorize entities exhibiting similar financial behaviors, such as timely payments or high spending, into specific segments. The systems can analyze to form groups that share common characteristics, allowing for a more structured approach to managing customer data.

In some examples, the systems can train a machine learning model to generate group performance metrics (e.g., scores) for the groups. The training process may include assigning uniform weights and adjusting those weights based on activity data like payment history and spending patterns within those segments. During training, the systems can dynamically adjust these weights to reflect changes in customer behavior, ensuring that the machine learning model remains accurate and responsive to new data.

In different examples, once the systems train the machine learning model, the systems can use the machine learning model to generate scores for each group. The machine learning model can generate the scores based on the aggregated data from the segments within each group. The system can use the scores as a metric for evaluating the financial health and behavior of each group, providing a basis for further analysis and decision-making.

In various examples, the systems can allocate different resources to each group based on the generated scores. The systems allocate the resources to optimize resource distribution by targeting groups with favorable scores for benefits such as reduced fees or enhanced services. The systems uses various channels (e.g., application programming interfaces (APIs)) to display how resources are allocated to each group, thereby encouraging entities within a group to improve their behaviors and transition to more favorable groups. The systems can provide such information via real-time displays on digital channels, where customers can view their current group, the score associated with that group, and the benefits available to other groups. As a result, the systems may nudge customers by showing them the potential advantages of belonging to a higher-scoring group. The visual comparison may server as a motivational tool that prompts customers to adopt better financial habits to qualify for the benefits enjoyed by other groups.

The systems can obtain data in batches, with each batch corresponding to regular intervals to recategorize segments and the assign new scores. Additional data may include various customer behaviors such as spending patterns, payment history, and credit utilization. The systems analyze additional or changed data points to identify changes in customer behavior, which may necessitate a shift in segment categorization and/or grouping. Once the systems recategorize those segments, the systems further determine if the groups needs to be changed. Consequently, the systems may retrain and/or use the machine learning model to assign new scores for each group. The systems can repeat the process as they obtain new data related to the entities and identify any new entities that qualify to be moved to a higher-scoring group.

Techniques described and suggested in the present disclosure improve the field of computing, especially the field of user clustering and resource allocation, by optimizing the utilization of computing resources through accurate clustering and scoring of groups using machine learning models.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Any system or apparatus feature as described herein may also be provided as a method feature, and vice versa. System and/or apparatus aspects described functionally (including means plus function features) may be expressed alternatively in terms of their corresponding structure, such as a suitably programmed processor and associated memory. It should also be appreciated that particular combinations of the various features described and defined in any aspects of the present disclosure can be implemented and/or supplied and/or used independently.

Any system or apparatus feature as described herein can include computer programs and computer program products comprising software code adapted, when executed on a data processing apparatus, to perform any of the methods and/or for embodying any of the apparatus and system features described herein, including any or all of the component steps of any method. Any system or apparatus feature as described herein can also include a computer or computing system (including networked or distributed systems) having an operating system that supports a computer program for carrying out any of the methods described herein and/or for embodying any of the apparatus or system features described herein. Any system or apparatus feature as described herein can also include a computer readable media having stored thereon any one or more of the computer programs aforesaid. Any system or apparatus feature as described herein can include a signal carrying any one or more of the computer programs aforesaid.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 1 illustrates an example of system 100 to perform group scoring, in accordance with an embodiment. System 100 may include segmentation and scoring system 110, services 140, and entities 150. In some examples, system 100 may include software implemented at one or more computing systems, which comprises computing device 700 illustrated in FIG. 7. Alternatively, system 100 may refer to any combination of software logic, hardware logic, and circuitry described herein to perform various techniques described herein for segmentation and scoring.

In various examples, terms such as "software" described herein may include one or more of operating systems, device drivers, application software, database software, graphics software, web browsers, development software (e.g., integrated development environments, code editors, compilers, interpreters), network software, simulation software, real-time operating systems (RTOS), artificial intelligence software, robotics software, firmware (e.g., BIOS/UEFI, router, smartphone, consumer electronics, embedded systems, printer, solid state drive (SSD)), APIs, containerized software, container orchestration platform, algorithms, instructions, and any other implementation embodied as a software package, code and/or instruction set.

Terms such as "hardware" described herein may include one or more of central processing units (CPU), integrated circuit (IC), system on-chip (SoC), graphics processing unit (GPU), data processing unit (DPU), digital signal processor (DSP), tensor processing unit (TPU), accelerated processing unit (APU), application-specific integrated circuits (ASIC), intelligent processing unit (IPU), neural processing unit (NPU), smart network interface controller (SmartNIC), vision processing unit (VPU), field-programmable gate array (FPGA) hardwired circuitry, programmable circuitry, state machine circuitry, fixed function circuitry, execution unit circuitry, and/or firmware that stores instructions executed by programmable circuitry.

In at least one embodiment, segmentation and scoring system 110 may include a distributed system configured to efficiently handle large-scale data processing and service delivery. The distributed system may spread tasks across multiple interconnected servers to ensure that no single point of failure can disrupt the system's overall functionality. Each server, or node, in the distributed system can be responsible for a specific portion of the backend operations, such as data storage, processing, or handling signals from clients (e.g., requests). By leveraging this setup, segmentation and scoring system 110 may handle increased demand by simply adding more nodes. Furthermore, the distributed system may improve fault tolerance and reliability by redistributing its tasks to other operational nodes in response to failure of at least one node. The distributed system may facilitate communication and coordination among nodes through one or more of algorithms and protocols to ensure data consistency and synchronization segmentation and scoring system 110.

In at least one embodiment, segmentation and scoring system 110 may refer to one or more of hardware and software described herein to perform grouping of entities and scoring of those groups using machine learning models. Segmentation and scoring system 110 may include processor 112, hardware accelerator 114, storage 116, network components 118, machine learning module 120, and segmentation and scoring module 122.

In at least one embodiment, processor 112 may refer to a central unit within a device or system (e.g., segmentation and scoring system 110) that can execute instructions and perform calculations necessary to run software and process data. Processor 112 may include one or more CPUs or any other general-purpose processors.

In at least one embodiment, hardware accelerator 114 may refer to computing hardware or circuitry designed to speed up specific computational tasks (e.g., machine learning tasks described herein) by offloading them from processor 112. Hardware accelerator 114 may include one or more of GPUs, FPGAs, ASICs, TPUs, DSPs, NPUs, cryptographic accelerators, storage accelerators, NICs, physics processing units (PPUs), video encoders/decoders, quantum processing units (QPUs), etc. In some examples, modules such as machine learning module 120 and segmentation and scoring module 122 can use hardware accelerator to perform machine learning training and inferencing to perform, for example, group scoring.

In some examples, storage 116 may refer to one or more hardware and software described herein to store, retrieve, and manage data, allowing information to be saved and accessed by processor 112, hardware accelerator 114, network components 118, machine learning module 120, segmentation and scoring module 122, and services 140. Storage 116 may include one or more of random-access memory (RAM), read-only memory (ROM), flash memory (e.g., Universal Serial Bus (USB) flash drives, SSD, memory cards), cache memory, hard disk drives (HDDs), virtual memory, graphics memory, optical discs, network attached storage (NAS), cloud storage, tape storage, etc. Additionally, storage 116 may further include one or more of relational databases, NoSqL databases, Key-Value stores, Document-oriented databases, column-family stores, and graph databases. In addition, the storages may also include one or more of code repositories, artifact repositories, content repositories, document repositories, package repositories, etc. And also, storage 116 may include one or more of file storage (e.g., network attached storage (NAS), cloud storage service), block storage, object storage, cache storage, tape storage, etc.

In at least one embodiment, storage 116 may include portions that are integrated with one or more portions of segmentation and scoring system 110 (e.g., processor 112, hardware accelerator 114, storage 116, network components 118, machine learning module 120, segmentation and scoring module 122). Storage may include logical units dedicated for each portion. In some examples, storage 116 may include one or more portions that are for real-time data access and one or more other portions that are connected to backup systems to maintain disaster recovery protocols.

In at least one embodiment, storage 116 may include entity data, such as, for example account data, transaction data (e.g., deposits, withdrawals, payments, authentication and security data, financial data (e.g., account balance, spending and deposit trends, loan or credit card information, investment portfolio), communication preferences, behavioral data (e.g., login frequency, feature usage, spending categories and patterns), user preferences, compliance data, or any other activity data related to entities 150 usable by machine learning module 120 and/or segmentation and scoring module 122 to perform group segmentation and grouping for resource allocation.

In at least one embodiment, network components 118 may refer to one or more devices that facilitate communication by connecting various components of system 100 (e.g., processor 112, hardware accelerator, storage 116, machine learning module 120, segmentation and scoring module 122, services 140, entities 150) or additional devices, such as such as computers, servers, and mobile devices, to enable exchange of data. Network components 118 may include wired connections like Ethernet cables or wireless technologies like Wi-Fi and cellular networks. Network components 118 may utilize standardized communication protocols, such as TCP/IP, to ensure that data is transmitted accurately and reliably between devices. Network components 118 can configure networks into various topologies, such as star, mesh, or ring, to optimize performance and fulfill specific operational requirements.

In some examples, network components 118 may support various forms of data exchange, such as packet switching, which breaks data into packets for efficient transmission, or circuit switching, which establishes a dedicated communication path. Network components 118 can include routing and switching devices to manage the flow of data, ensuring that it reaches the correct destination. Additionally, network components 118 may implement network security protocols, such as encryption and firewalls, to regulate access and safeguard data during transmission.

In at least one embodiment, machine learning module 120 may refer to a module that trains and deploys machine learning modules to perform various techniques described herein. In some examples, machine learning modules may refer to a mathematical representation or algorithm trained on data to identify patterns, make predictions, or perform tasks such as classification, regression, or clustering based on input data. Machine learning models may include linear regression, logistic regression, support vector machines, decision trees, random forests, K-means clustering, hierarchical clustering, and neural networks.

In at least one embodiment, the neural networks may include, for example, convolutional neural networks (CNNs), recurrent neural networks (RNNs), long short-term memory (LSTM) networks, generative adversarial networks (GANs), autoencoders, transformer networks (e.g., bidirectional encoder representations from transformers (BERT), generative pre-trained transformer (GPT), text-to-text transfer transformer (T5), vision transformers (ViT), XLNet, etc.), feedforward neural networks, etc.

In at least one embodiment, machine learning module 120 can perform machine learning training. For example, machine learning module 120 can accept various data sources and dynamically scales to accommodate large datasets. Machine learning module 120 can perform optimization algorithms such as stochastic gradient descent or adaptive methods and also perform hyperparameter tuning to train machine learning models described herein. Machine learning module can track progress on loss, accuracy and other relevant metrics and performs checkpointing to manage model snapshots at custom intervals.

In at least one embodiment, machine learning module 120 can load one or more trained model checkpoints and provide a prediction interface. Machine learning module 120 can validate incoming data for inferencing to ensure that the input match the expected format before being passed through the machine learning model. In some examples, machine learning module 120 may include system 200 illustrated in FIG. 2.

In at least one embodiment, segmentation and scoring module 134 may refer to a module to categorize customer segments, group similar segments, and assign scores to these groups based on various data (e.g., activity data). Segmentation and scoring module 134 may analyze analyzing existing customer data, including spending patterns, payment history, credit utilization, and overall financial activity. Segmentation and scoring module 134 may generate distinct segment profiles such as "timely payers," "occasional defaulters," "high spenders," and "low-risk customers." In some examples, the profiles are not static as segmentation and scoring module 134 can dynamically assign based on the analysis.

In at least one embodiment, segmentation and scoring module 134 may perform clustering algorithms (e.g., K-means clustering, hierarchical clustering, density-based clustering of application with noise (DBSCAN), Gaussian mixture models) to group entity segments based on their similarities.

Segmentation and scoring module 134 may use machine learning module 120 to train one or more machine learning models described herein to generate scores for each group. Machine learning module 120 may initialize weights for various factors, such as timely payments and spending levels, which are used to train the model. Machine learning module 120 may assign weights uniformly. Machine learning module 120 may dynamically adjust the weights based on the observed behaviors within each group during each training iteration. For example, if a segment exhibits a significant change in payment behavior, the weights assigned to that segment can be recalibrated to reflect this change. The scoring process can be dynamic and subject to regular updates, ensuring that the scores accurately represent the current financial behaviors of the group members. Machine learning module 120 also incorporates additional factors, such as income falsification and property ownership, into the score computation process, providing a comprehensive assessment of each group's financial behavior. Segmentation and scoring module 134 can identify and exclude outliers, or data points that fall outside a certain range, are identified and excluded from the score calculations to prevent skewed results. The machine learning model can perform regression (e.g., linear regression, polynomial regression, support vector regression, decision tress, random forest, k-nearest neighbors) when assigning weights.

Segmentation and scoring module 122 may repeat the machine learning training and inference process as it receives customer data in batches at regular intervals. In some examples, segmentation and scoring module 122 may recategorize some entities to be part of different segments or groups using changed or additional customer data. In other examples, segmentation and scoring module 122 may recalculate group scores using one or more trained machine learning models, which may result in some groups that were allocated fewer resources receiving more resources, or even fewer resources. In various examples, segmentation and scoring module 122 may recalculate group scores such that, as a result of some entities moving from one group to another, the rankings of groups (based on group scores) could change. In some examples, some groups can be added or removed as a result of recategorization of segments using updated customer data.

In at least one embodiment, segmentation and scoring module 134 may generate different scores for different groups. For example, segmentation and scoring module 134 may generate a higher score for first group 152 and a lower score for second group 154. Based on these scores or any other group performance metrics, segmentation and scoring module 134 may allocate resources such as financial benefits, marketing efforts, or service enhancements. For instance, groups with higher scores, indicating positive financial behaviors, may receive reduced minimum payments or lower annual fees. Conversely, groups with lower scores may not receive such benefits, encouraging members to improve their financial habits to qualify for better resource allocation.

In some examples, better resource allocations may include allocation of more computing resources such that services 140 can better provide personalized benefits to entities within higher groups. In other examples, segmentation and scoring module 134 may cause higher-scoring groups to receive access to a dedicated, high-performance server infrastructure ensuring faster transaction processing, lower latency in digital banking services, and priority handling of account requests. In various examples, segmentation and scoring module 134 may cause higher scoring groups to receive benefits from advanced analytics powered by artificial intelligence (AI) and machine learning, offering personalized financial insights, exclusive investment opportunities, and proactive alerts tailored to their preferences. Additionally, segmentation and scoring module 134 may cause dedicated virtual assistants or priority access to customer support systems that uses enhanced computing resources to resolve issues more efficiently.

Additionally, segmentation and scoring module 134 may cause services 140 to display how the resources are allocated to each group, allowing entities within lower-scoring groups (e.g., second group 154) to see the benefits associated with higher-scoring groups, such as reduced fees or better terms.

In at least one embodiment, services 140 may refer to one or more functionalities and systems that financial institutions or other organizations provide to entities 150. Services 140 may include account management and transaction processing, as well as broader app- or web-based offerings such as payment solutions, investment tools, insurance platforms, or customer support systems. Services 140 may allow entities 150 to perform checking balances, transferring funds, or applying for loans. Services 140 may allow entities 150 to perform peer-to-peer transfers, pay bills, or conduct in-store purchases. Services 140 may allow entities 150 to manage portfolios, analyze market trends, and receive personalized recommendations. Services 140 may allow entities 150 to purchase, manage, and claim insurance policies. Services 140 may allow entities 150 to apply for and manage loans or credit cards. Services 140 may engage entities 150 chat systems, AI-powered chatbots, or call center integrations.

In at least one embodiment, entities 150 may refer to an individual, organization, or system that consumes, utilizes, or interacts with specific offerings provided by services 140. In some examples, entities 150 can use one or more computing devices (e.g., desktop, laptop, mobile phone, tablets, smartwatch, embedded systems in vehicles, smartTVs, voice-enabled devices, IoT devices) to interact with one or more applications provided by services 140. These interactions can occur through various channels, such as native applications, web-based interfaces, or APIs tailored to the specific capabilities of the device. For instance, services 140 may provide responsive web applications or mobile apps that adapt to different screen sizes and input methods, ensuring seamless access regardless of whether the entity is using a desktop, laptop, mobile phone, or tablet.

Additionally, services 140 can use real-time communication protocols, such as WebSockets or push notifications, to deliver timely updates or alerts to entities 150. For devices like smartwatches or voice-enabled systems, services 140 may use streamlined APIs or lightweight data exchanges optimized for limited screen space or voice interaction capabilities. In scenarios involving IoT devices or embedded systems in vehicles, services 140 can integrate through specialized SDKs, enabling these devices to retrieve and display relevant data or execute specific commands initiated by entities 150. In some examples, services 140 can include interface 330 illustrated in FIG. 3.

In some examples, entities 150 can be segmented into first group 152 and second group 154 by segmentation and scoring module 122. First group 152 with higher scores, may include entities with exemplary metrics, such as strong financial stability, consistent repayment history, or high transaction volumes. First group 152 can be allocated, by resource allocation module 136 and/or services 140, a greater share of resources, such as preferential interest rates, larger credit limits, or access to premium financial products, as they are deemed to offer lower risk and higher potential returns. Conversely, second group 154 with lower scores, includes entities with limited financial history, inconsistent repayment patterns, or higher risk factors, second group 154 can be allocated, by resource allocation module 136 and/or services 140 fewer resources, with access limited to basic services or stricter lending conditions, reflecting the cautious approach taken to mitigate potential losses. In some examples, first group 152 may include first group 310 illustrated in FIG. 3 and second group 154 may include second group 320 illustrated in FIG. 3.

Figure 2:
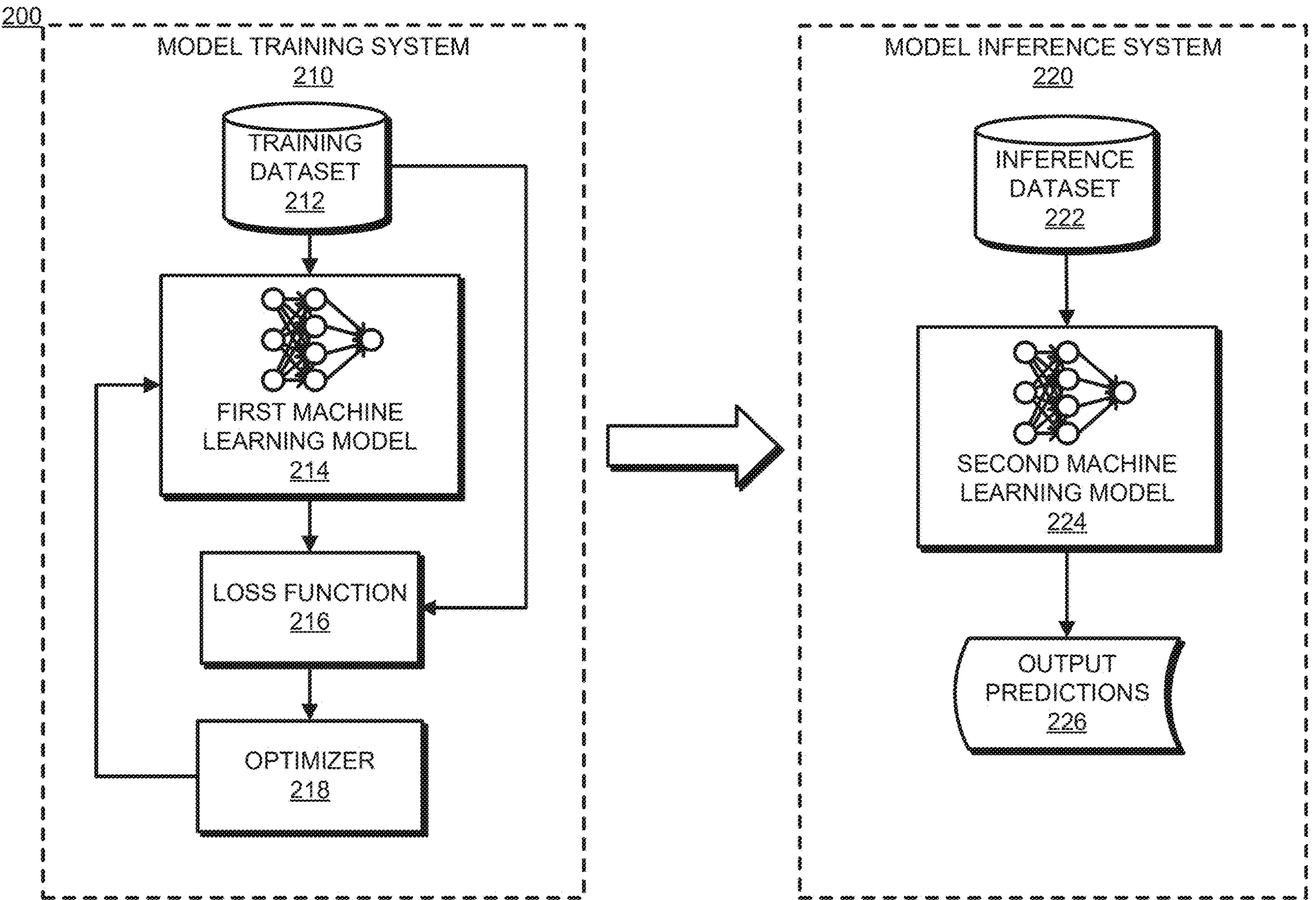
FIG. 2 illustrates an example of a system to train and deploy machine learning models, in accordance with an embodiment.

FIG. 2 illustrates an example of system 200 to train and deploy machine learning models, in accordance with an embodiment. The machine learning models can perform various functions described herein, such as grouping users, scoring groups, and allocating resources.

In at least one embodiment, system 200 may include model training system 210 and model inference system 220. Model training system 210 may refer to one or more of software and hardware described in conjunction with FIG. 1 to train one or more machine learning models described herein. Model training system 210 may include one or more frameworks such as TensorFlow, PyTorch, Keras, MXNet, Caffe, Theano, etc. Model training system 210 may include using one or more hardware accelerators described herein (e.g., GPUs) to accelerate one or more portions to train neural network such as, for example, first machine learning model 214. First machine learning model 214 may include the one or more machine learning models described in conjunction with FIG. 1.

In at least one embodiment, model training system 210 may normalize and transform input data, such as training dataset 212. Model training system 210 may perform data normalization processes that scale feature values to a standard range, such as min-max scaling or z-score normalization. Model training system 210 may generate additional training samples to be added to training dataset 212 through transformations like rotation, flipping, or cropping. Model training system 210 may perform feature extraction operations, extracting relevant attributes from raw data, and feature selection, identifying the most significant features for first machine learning model 214. Model training system 210 may remove noise, address missing values, perform data cleaning tasks for training dataset 212.

In at least one embodiment, model training system 210 define the layers and connections of first machine learning model 214. model training system 210 may determine the type of each layer, such as convolutional, recurrent, or fully connected layers, and set parameters like the number of neurons or filters. Model training system 210 may assign specific activation functions, such as ReLU or sigmoid, to each layer to introduce non-linearity. Model training system 210 may establishes connection patterns by configuring how layers interact, including sequential arrangements, skip connections, or branching paths. Model training system 210 may define inputs and output layers to ensure appropriate data flow through first machine learning model 214. Model training system 210 may initialize weights and biases for each connection, setting initial values that influence the training process. In some examples, initializing of weights and biases may include (1) Zero Initialization, which sets all weights to zero; (2) random Initialization, where weights are set to small random values; (3) Glorot Initialization that adjusts the scale of the weights according to the number of input and output neurons; and (4) He Initialization that sets weights with a variance scaled by the number of input neurons.

In at least one embodiment, first machine learning model 214 may refer to the one or more machine learning models described in conjunction with FIG. 1. In some examples, first machine learning model 214 may include an untrained model which may refer to a model (e.g., neural network) architecture that has been initialized but not yet exposed to any training data. In various examples, first machine learning model 214 may include pre-trained models, such as VGG, ResNet, GoogleNet, EfficientNEt, YOLO, BERT, GPT, T5, RoBERTa, XLNet, DeepSpeech, Wav2Vec, Jasper, AlphaZero, StyleGAN, etc. In other examples, first machine learning model 214 may include second machine learning model 224 that is already trained.

In at least one embodiment, training dataset 212 may refer to a collection of labeled or unlabeled data used to train first machine learning model 214. Training dataset 212 may include input samples, which represent the features or attributes that the neural network processes, and corresponding target outputs, which first machine learning model 214 aims to predict. Training dataset 212 may include batches or mini-batches. Training dataset 212 may include various data formats, such as images, text, or numerical data, by structuring the data in formats compatible with the input layer of first machine learning model 214. Additionally, training dataset 212 may include metadata that provides information about the data sources, labeling schemes, and any preprocessing steps applied, as noted above. In some examples, there can be one or more machine learning models (separate from first machine learning model 214) that generates training dataset 212. For example, the one or more machine learning models may include Generative Adversarial Networks (GANs) or Variational Autoencoders (VAEs) that mimic the characteristics of a genuine dataset.

In at least one embodiment, model training system 210 may perform forward pass using training dataset 212. The forward pass may refer to a process where input data from training dataset 212 propagates through first machine learning model 214 to generate output predictions. The forward pass may include feeding input samples into the input layer of first machine learning model 214, sequentially passing data through each hidden layer of first machine learning model 214 by applying the defined activation functions and producing outputs in the output layer of first machine learning model 214. Model training system 210 may process each layer's computations by performing matrix multiplications with weights, adding biases, and applying activation functions to introduce non-linearity.

In at least one embodiment, model training system 210 uses loss function 216 to evaluate discrepancy between the output predictions and actual target values from training dataset 212 generated during the forward pass. Loss function 216 may include mechanisms for calculating the difference using specific mathematical formulations, such as mean squared error for regression tasks or cross-entropy loss for classification tasks. Loss function 216 can include aggregations of individual errors across the training samples to produce a single scalar value representing the overall performance of first machine learning model 214.

In at least one embodiment, optimizer 218 may refer to a computational component that adjusts weights and biases of first machine learning model 214 to minimize loss function 216. Optimizer 218 may include algorithms such as stochastic gradient descent (SGD), Adam, and RMSprop, each implementing specific strategies for updating parameters based on calculated gradients. Optimizer 218 may calculate gradients of loss function 216 with respect to each parameter by applying backpropagation, determining the direction and magnitude of adjustments needed. Optimizer 218 may manage learning rates, which control the step size of each update, and may incorporate techniques like momentum to accelerate convergence by considering past gradient information. Optimizer 218 may perform adaptive learning rate adjustments and allow different parameters to be updated at varying rates based on their individual gradient histories. Optimizer 218 may execute iterative update rules during each training epoch, systematically refining parameters of first machine learning model 214 to progressively reduce the loss and improve the performance of first machine learning model 214 on training dataset 212.

In at least one embodiment, model training system 210 may perform training in a supervised, partially supervised, or unsupervised manner. Model training system 210 may perform federated learning, where multiple decentralized devices or servers collaboratively train first machine learning model 214 while keeping the training data (e.g., portions of training dataset 212) localized.

In at least one embodiment, model training system 210 may perform fine tuning of first machine learning model 214. Fine tuning may refer to performing additional training on a new, often more specific dataset to adapt its parameters for a particular task. Fine tuning may include loading the pre-trained weights and biases into the architecture of first machine learning model 214, selecting specific layers of first machine learning model 214 to update while freezing others to retain previously learned features. Fine tuning may include reinitializing certain layers of first machine learning model 214 if necessary and applying regularization techniques to prevent overfitting during the subsequent training phases. Fine tuning may include configuring a lower learning rate to make subtle adjustments to the parameters of first machine learning model 214 of to ensure that the existing knowledge is preserved while accommodating new information. Fine tuning may include inserting layers into a pre-trained model to adapt it to a new task or domain without altering the original model's parameters. For example, fine tuning may include low-rank adaptation (LoRA) that includes adding low-rank matrices to some layers of first machine learning model 214, which are trained on the new task while keeping the original model weights frozen to reduce computational and memory costs. Additionally, fine tuning may include prompt tuning, which includes adjusting a pre-trained model's performance on specific tasks by optimizing task-specific continuous embeddings added to the input while leaving model's original parameters unchanged.

In at least one embodiment, model training system 210 may perform the iterative process until first machine learning model 214 achieves a desired accuracy. For example, model training system 210 may evaluate first machine learning model 214 using a test or validation set and the accuracy can be the ratio of correctly predicted labels. In some examples, accuracy of first machine learning model 214 may depend on the final loss on the test or validation set. After determining that the desired accuracy is met, first machine learning model 214 becomes second machine learning model 224. In some examples, second machine learning model 224 may refer to one or more machine learning models described in conjunction with FIG. 1.

In at least one embodiment, model inference system 220 may refer to a framework that executes trained machine learning models, such as second machine learning models 224 to generate output predictions 226 based on new input data, such as inference dataset 222. Model inference system 220 may load and initialize parameters (e.g., weights, biases) of second machine learning models 224 into the runtime environment. Model inference system 220 feeds inference dataset 222 to input layer of second machine learning model 224, where values are generated and propagated through one or more layers of second machine learning model 224 and output predictions 226 are generated. In some examples, inference dataset 222 may include images, videos, text, audio, etc. inference dataset 222 may include synthetic data generated by neural networks (e.g., GAN) other than second machine learning model 224.

In at least one embodiment, model inference system 220 may include cloud servers or edge devices to deploy second machine learning model 224. Model inference system 220 may include cores, devices, inference chips, GPUs to generate activations to further generate output predictions 226. Output predictions 226 may include classification labels, probability distributions, continuous numerical values, sequences, images, translations, embeddings, actions, structured data outputs, audio, heatmaps, attention maps, generative content, etc.

Figure 3:
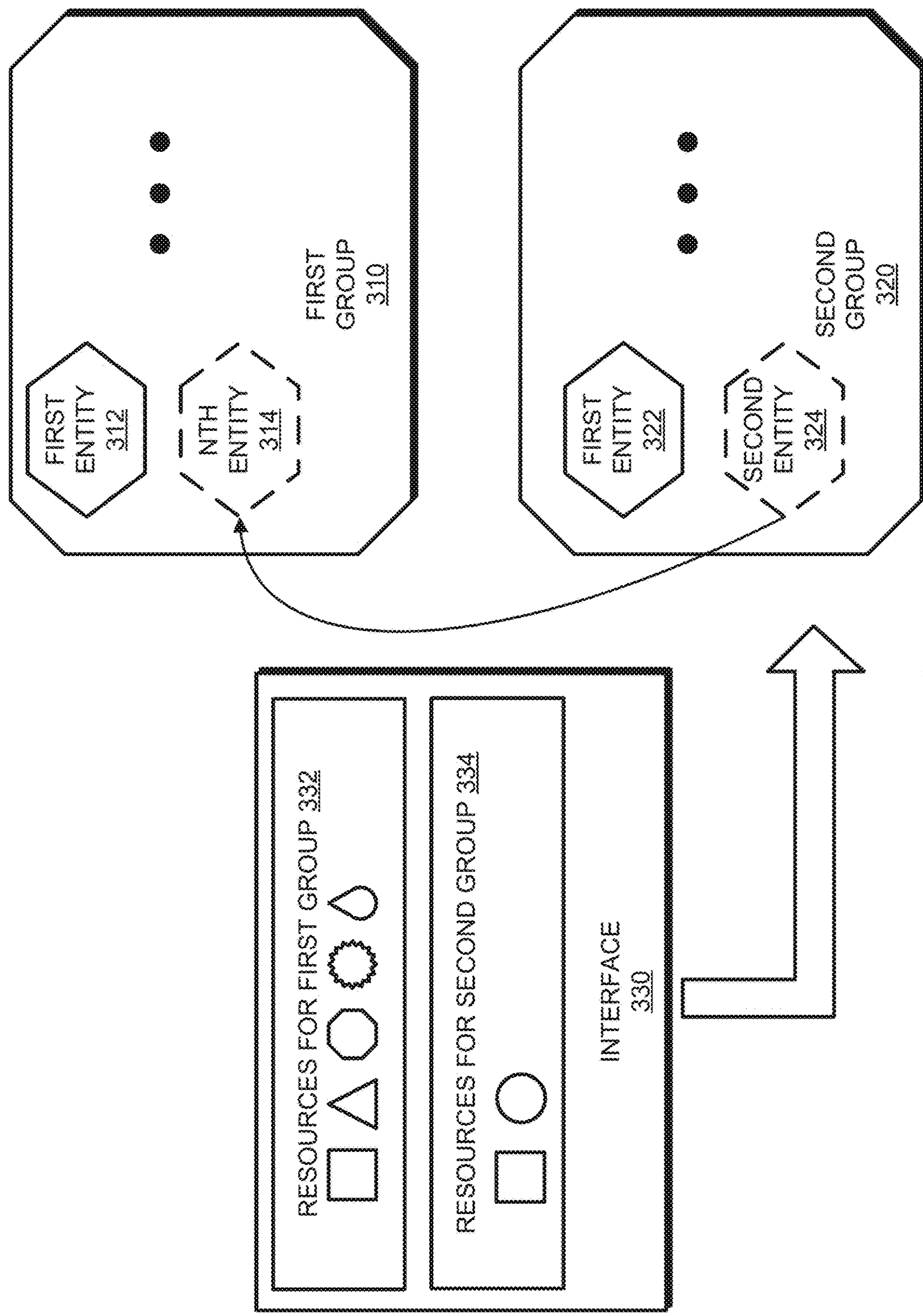
FIG. 3 illustrates an example of a system that provides how data is allocated, in accordance with an embodiment.

FIG. 3 illustrates an example of system 300 that provides how data is allocated, in accordance with an embodiment. In at least one embodiment, system 300 may provide GUI elements (e.g., interface 330) to enable entities to visually interact with account and transaction data through an application or website. System 300 may dynamically generate and display, via interface 330, user-specific content, such as account balances, transaction histories, and personalized recommendations, based on real-time data retrieved from backend services (e.g., segmentation and scoring system 110 illustrated in FIG. 1). The system may utilize data visualization techniques, such as charts, graphs, and dashboards, to help entities better understand complex information. System 300 may include security features, including encrypted data transmission via HTTPS and session management protocols to protect sensitive visual content. In some examples, system 300 may include logging and monitoring features to track user interactions and optimize content delivery.

In at least one embodiment, via interface 330, system 300 provides how different resources are allocated to different groups (e.g., first group 310, second group 320). In some examples, computing resources may include distributed databases, machine learning algorithms, application programming interfaces (APIs) or any other cloud computing infrastructure to provide personalized, targeted, or any other tailored offers (e.g., cashback rewards, discounts, royalty points). Computing resources may include advanced security and privacy capabilities. Computing resources may include personalized financial services, higher interest rates or returns, lower fees for wire transfers, international transactions, and overdraft protection, exclusive credit cards, travel perks, priority services, exclusive events, access to premium products, enhanced spending rewards, luxury perks, etc.

In at least one embodiment, interface 330 may include APIs (e.g., Open API, REST API, SOAP API) to provide visuals including the comparison between first group 332 and second group 320. For example, system 300 may call its internal APIs to fetch data related to first group 332 and second group 320. System 300 may send the data using Open API for visual rendering. In some examples, second group 320 may receive, via interface 330, an indication that the resources for first group 332 are different from those for the second group 334. In some examples, the indication may also include details on how these differences manifest. For instance, the first group 310 may receive more personalized financial services, higher interest rates or returns, lower fees, exclusive offers, etc., compared to those offered to the second group 320. The indication may further include details of behaviors that entities in the second group 320 can perform to join the first group 310. The behaviors may include, maintaining high account balances, frequent and high-value transactions, investing in bank products, cross-selling engagement, meeting spending thresholds, demonstrating loyalty (e.g., long-term relationships), participating in special programs (e.g., wealth management), engaging in partnered activities (e.g., spending on partner merchants, participating in co-branded promotional events), etc.

In at least one embodiment, as a result of receiving the indication, system 300 may receive changed or additional activity data including changed behavior of second entity 324. In response to the changed or additional activity data, system 300 may perform one or more blocks of process 400 illustrated in FIG. 4 and/or process 500 illustrated in FIG. 5 to perform group segmentation, group scoring, and resource allocation to move second entity 324 to be nth entity 314 of first group 310. Additionally, more entities with reduced resources provided by system 300 can move to groups like the first group 310, allowing for the allocation of additional resources.

Figure 4:
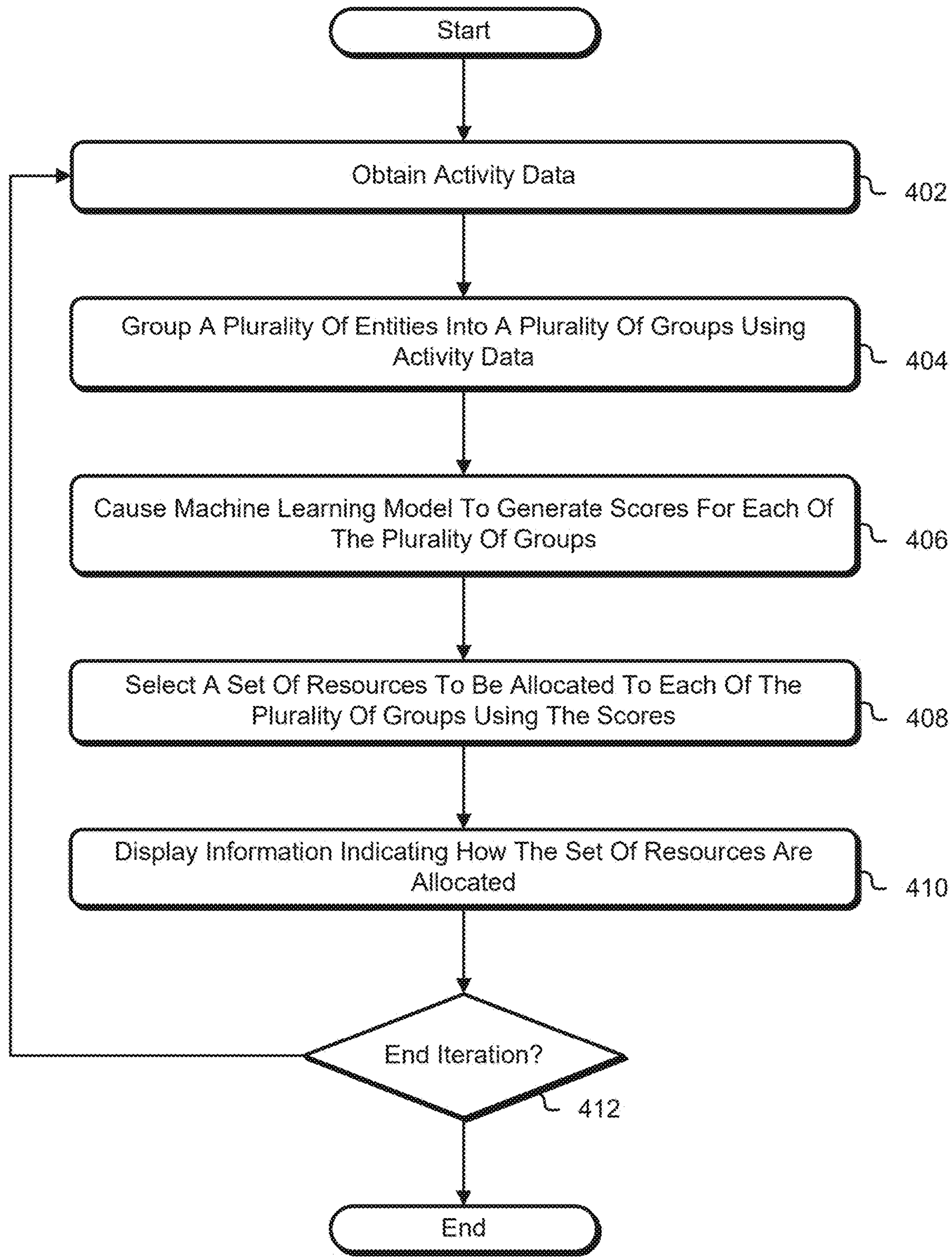
FIG. 4 is a flowchart that illustrates an example of generating group scores, in accordance with an embodiment.

FIG. 4 is a flowchart that illustrates an example process 400 of generating group scores, in accordance with an embodiment. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system (e.g., segmentation and scoring system 110, processor 112, hardware accelerator 114, storage 116, network components 118, machine learning module 120, segmentation and scoring module 122, services 140, entities 150 illustrated in FIG. 1, model training system 210, first machine learning model 214, model inference system 220, second machine learning model 224 illustrated in FIG. 2, interface 330 illustrated in FIG. 3, and one or more of hardware and software described in conjunction with FIG. 1).

At block 402, process 400 may include obtaining customer data, such as activity data on a plurality of entities. The customer data may include transaction history, channel preference, service usage, compliant history, engagement with promotions, account balances, loan information, credit score, investment portfolio, spending patterns (e.g., recurring bills, discretionary expenses, saving rates), risk appetite, financial goals, lifestyle preferences, brand loyalty, online banking activity, mobile app behavior, social media engagement. In some examples, other kinds of data such as demographic data (e.g., age, gender, marital status, occupation, income level, education level, dependents) and/or geographic data (e.g., address) can be obtained.

At block 404, process 400 may further include grouping a plurality of entities into a plurality of groups using the customer data. The grouping may include identifying multiple segments based on the categorization of individual entities within the plurality of entities and identifying similarities between these segments to identify the plurality of groups. The grouping may further include using clustering algorithms to identify the similarities between the segments.

At block 406, process 400 may further include causing one or more machine learning models to generate scores for each of the plurality of groups. Different types of machine learning models are described in conjunction with FIG. 1. The one or more machine learning models can be trained using the activity data and/or any other data. Training the one or more machine learning models may include initializing weights corresponding to each segment and adjusting these weights with each iteration during the training process. Additionally, training the one or more machine learning models may involve obtaining additional activity data in batches, with each batch corresponding to one or more time intervals. Alternatively, the one or more machine learning models are trained to assign values for each segment, and the scores of the groups are combined based on how many segments correspond to the groups.

At block 408, process 400 may further include selecting a set of resources to be allocated to each of the plurality of groups using the scores for each of the plurality of groups. The set of resources may include computing resources. The set of groups may include preferential interest rates, fee waivers, increased credit limits, flexible loan terms, priority banking, exclusive accounts, cashback offers, loyalty programs, discounts and deals, higher transaction limits, faster loan approvals, special events and webinars, exclusive products, better customer support, overdraft protection, free or discounted insurance, early access to features, enhanced security. In some examples, groups with higher scores can be allocated more or better resources, while groups with lower scores can be allocated fewer resources. In other examples, each group is allocated different resources. The set of resources may include additional computing power to perform advanced security measures, machine learning tasks, etc.

At block 410, process 400 may further include displaying information indicating how the set of resource are allocated. The information may include a comparison of resource allocations between different groups. At block 412, process 400 may further include determining whether there are batches of changed or additional activity data that need to be considered to group the plurality of entities into a new plurality of groups. If there are batches (e.g., sequential) of changed or additional activity data that need to be considered, process 400 may move to block 402 to obtain the changed or additional activity data.

Note that one or more of the operations performed in blocks 402-412 may be performed in various orders and combinations, including in parallel. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 5:
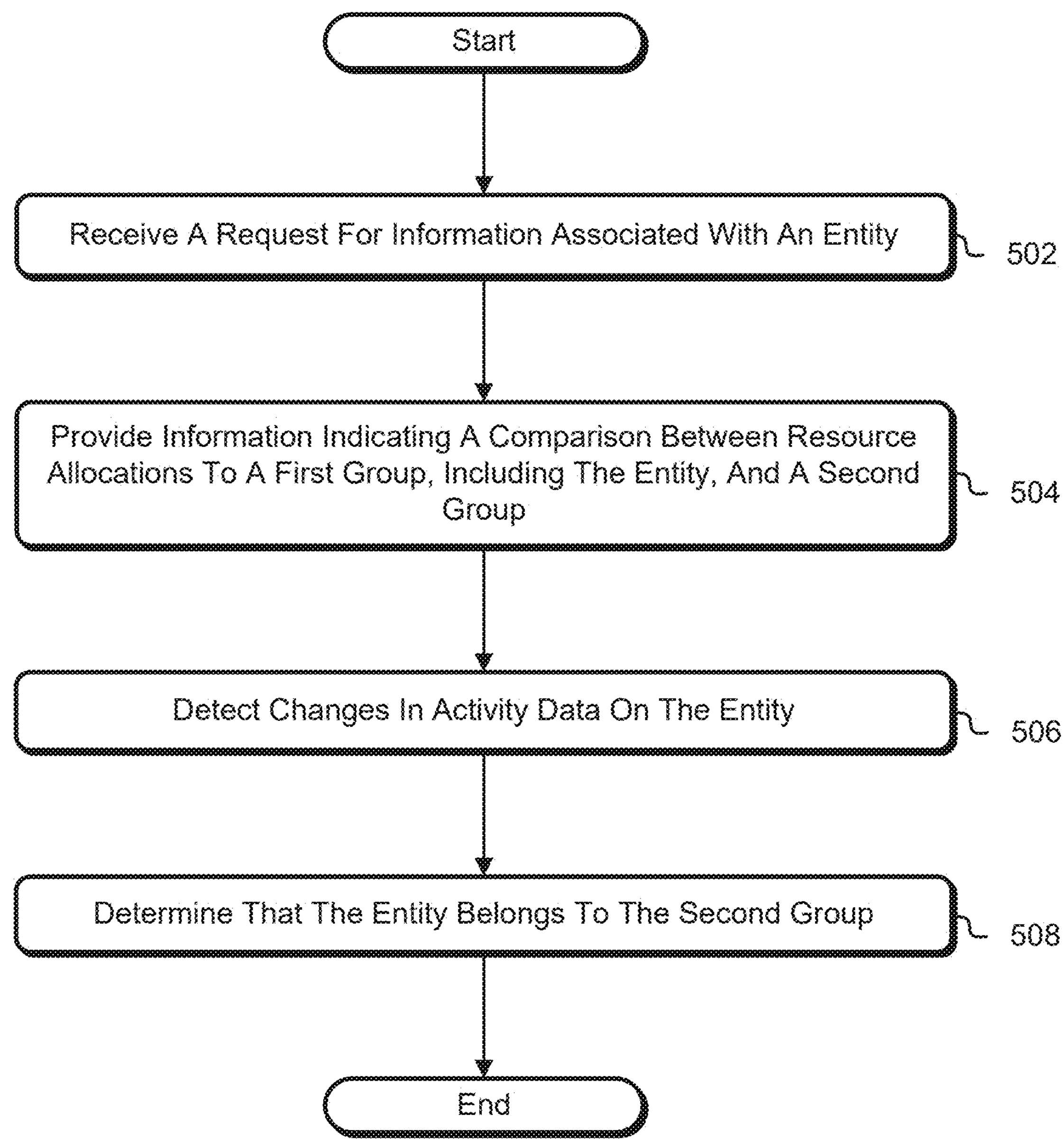
FIG. 5 illustrates a flowchart that illustrates an example of providing resource allocations, in accordance with an embodiment.

FIG. 5 is a flowchart that illustrates an example process 500 of providing resource allocations, in accordance with an embodiment. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 500 may be performed by any suitable system (e.g., segmentation and scoring system 110, processor 112, hardware accelerator 114, storage 116, network components 118, machine learning module 120, segmentation and scoring module 122, resource allocation module 136, services 140, entities 150 illustrated in FIG. 1, model training system 210, first machine learning model 214, model inference system 220, second machine learning model 224 illustrated in FIG. 2, interface 330 illustrated in FIG. 3, and one or more of hardware and software described in conjunction with FIG. 1).

At block 502, process 500 may include receiving a request for information associated with an entity. In some example, a system (e.g., services 140 illustrated in FIG. 1) receives the request for the information through a GUI. At block 504, process 500 may further include providing the information indicating a comparison between resource allocations to a first group, including the entity, and a second group. In some examples, the first group and the second group can be allocated different resources, with the second group receiving more resources, motivating the entity to change its behavior so that it can be moved to the second group when considering the comparison.

At block 506, process 500 may further include detecting changes in activity data on the entity. In some examples, a system (e.g., a segmentation and scoring system 110 illustrated in FIG. 1) identifies or receives changed activity data in response to providing the information indicating the comparison. At block 508, process 500 may further include determining that the entity belongs to the second group. In some examples, a system (e.g., a segmentation and scoring system 110 illustrated in FIG. 1) may move the entity as part of re-categorization of segments or groups. In other examples, the system may cause one or more machine learning models described herein to generate scores or any other group performance metrics for the segments or groups. As a result, the system may reallocate resources if there is a change of scores or any other group performance metrics.

Note that one or more of the operations performed in blocks 502-508 may be performed in various orders and combinations, including in parallel. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 6:
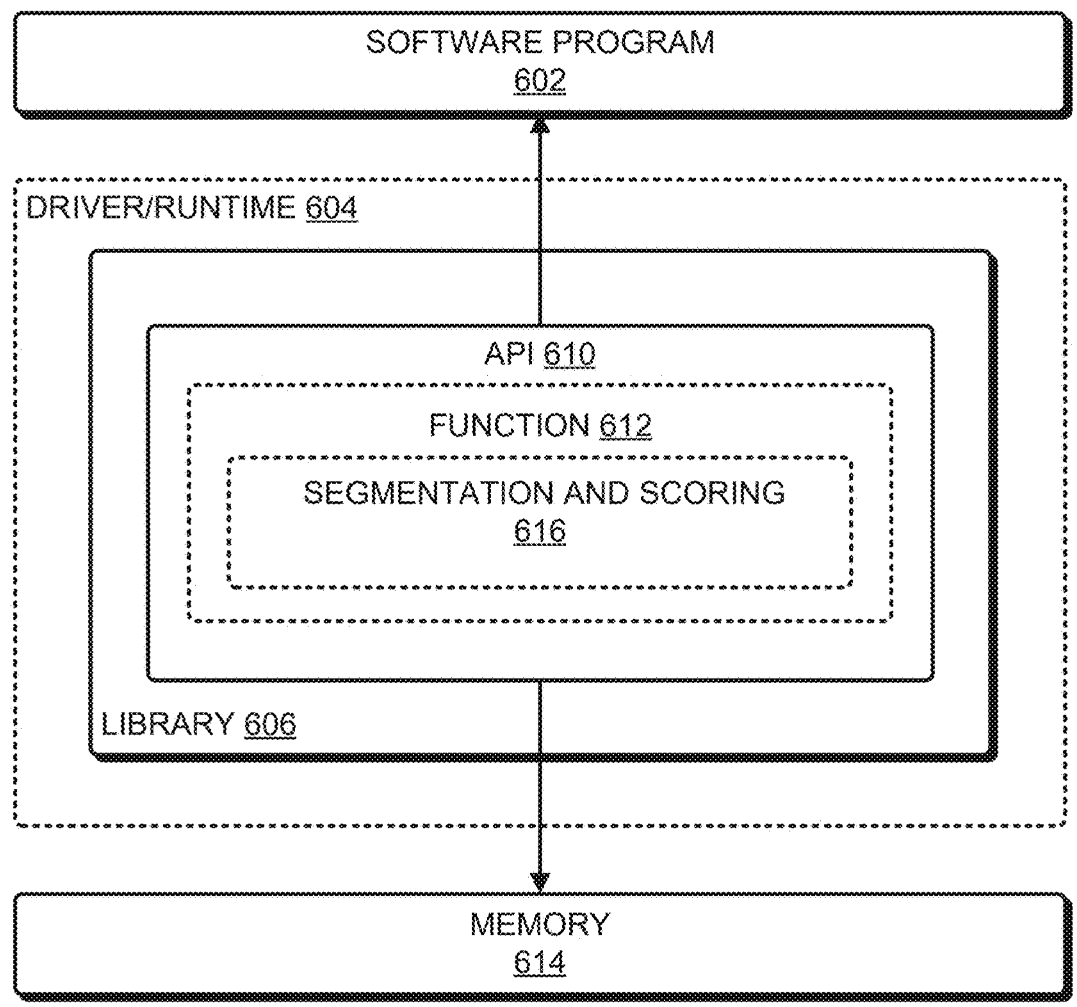
FIG. 6 illustrates an example of system to manage access controls using application programming interface (API), in accordance with at least one embodiment.

FIG. 6 is a block diagram illustrating driver and/or runtime software comprising one or more libraries to provide one or more application programming interfaces (APIs), in accordance with at least one embodiment. The one or more APIs may be provided to a system 100 illustrated in FIG. 1 and implemented at a computing device, such as the computing device 700 illustrated in FIG. 7. A software program 602 can be a software module. A software program 602 may comprise one or more software modules. One or more APIs 610 can be sets of software instructions that, if executed, cause one or more processors (e.g., hardware described in conjunction with FIG. 1) to perform one or more computational operations. One or more APIs 610 can be distributed or otherwise provided as a part of one or more libraries 606, runtimes 604, drivers 604, and/or any other grouping of software and/or executable code further described herein. One or more APIs 610 may perform one or more computational operations in response to invocation by software programs 602. A software program 602 can be a collection of software code, commands, instructions, or other sequences of text to instruct a computing device to perform one or more computational operations and/or invoke one or more other sets of instructions, such as APIs 610 or API functions 612, to be executed. In some examples, functionality provided by one or more APIs 610 may include software functions 66.

In at least one embodiment, one or more APIs 610 are hardware interfaces to one or more circuits to perform one or more computational operations. One or more APIs 610 described herein are implemented as one or more circuits to perform one or more techniques described above in conjunction with FIGS. 1-5. Additionally, one or more software programs 602 comprise instructions that, if executed, cause one or more hardware devices and/or circuits to perform one or more techniques described above in conjunction with FIGS. 1-5.

In at least one embodiment, software programs 602, such as user-implemented software programs, may utilize one or more APIs 610 to perform various computing operations, such as memory reservation, matrix multiplication, arithmetic operations, or any computing operation performed by any hardware described in conjunction with FIG. 1. One or more APIs 610 can provide a set of callable functions 616, referred to herein as APIs, API functions, and/or functions, that individually perform one or more computing operations. For example, one or more APIs 610 provide functions 616 to perform access code management 616, which are further described in conjunction with FIGS. 1-5. In some examples, feature and requirement management 616 includes performing one or more blocks of process 400 illustrated in FIG. 4 and/or process 50 illustrated in FIG. 5.

In at least one embodiment, an interface can be software instructions that, if executed, provide access to one or more functions 612 provided by one or more APIs 610. A software program 602 may use a local interface when a software developer compiles the one or more software programs 602 in conjunction with one or more libraries 606 comprising or otherwise providing access to one or more APIs 610. One or more software programs 602 can be compiled statically in conjunction with pre-compiled libraries 606 or uncompiled source code comprising instructions to perform one or more APIs 610. One or more software programs 602 can be compiled dynamically and the one or more software programs 602 can utilize a linker to link to one or more pre-compiled libraries 606 comprising one or more APIs 610.

In at least one embodiment, a software program 602 may use a remote interface when a software developer executes a software program that utilizes or otherwise communicates with a library 606 comprising one or more APIs 610 over a network or other remote communication medium. One or more libraries 606 comprising one or more APIs 610 can be performed by a remote computing service, such as a computing resource service provider. In another embodiment, one or more libraries 606 comprising one or more APIs 610 can be performed by any other computing host providing the one or more APIs 610 to one or more software programs 602.

In at least one embodiment, a processor performing or using one or more software programs 602 may call, use, perform, or otherwise implement one or more APIs 610 to allocate and otherwise manage memory 614 to be used by the software programs 602. Those software programs 602 may request a resource management system 616 receive and API call to obtain an access token, identify permissions, and generate the access token using functions 616 provided, in an embodiment, by one or more APIs 610.

In at least one embodiment, an API 610 can be provided by driver and/or runtime software 604. Driver and/or runtime software 604 may refer to data values and software instructions that, if executed, perform or otherwise facilitate operation of one or more functions 616 of one or more APIs 610 during load and execution of one or more portions of a software program 602. Runtime software 604 may refer to data values and software instructions that, if executed, perform, or otherwise facilitate operation of one or more functions 616 of one or more APIs 610 during execution of software program 602.

In at least one embodiment, one or more APIs 610 may provide combined arithmetic operations through driver and/or runtime software 604, as described above. One or more software programs 602 may utilize one or more APIs 610 provided by driver and/or runtime software 604 to allocate or otherwise reserve blocks of memory. One or more APIs 610 can perform operations performed by different systems (e.g., segmentation and scoring system 110, processor 112, hardware accelerator 114, storage 116, network components 118, machine learning module 120, segmentation and scoring module 122, resource allocation module 136, services 140, entities 150 illustrated in FIG. 1, model training system 210, first machine learning model 214, model inference system 220, second machine learning model 224 illustrated in FIG. 2, interface 330 illustrated in FIG. 3, and one or more of hardware and software described in conjunction with FIG. 1). In at least one embodiment, an exemplary block diagram 600 depicts one or more processors comprising one or more circuits to perform one or more software programs 602 to combine two or more APIs 610 into a single API.

In at least one embodiment, memory 614 may refer to one or more devices to store data. Memory 1014 may include one or more random access memory (RAM), read-only memory (ROM), flash memory (e.g., USB flash drives, SSD, memory cards), cache memory, hard disk drives (HDDs), virtual memory, graphics memory, optical discs, network attached storage (NAS), cloud storage, tape storage, etc.

Figure 7:
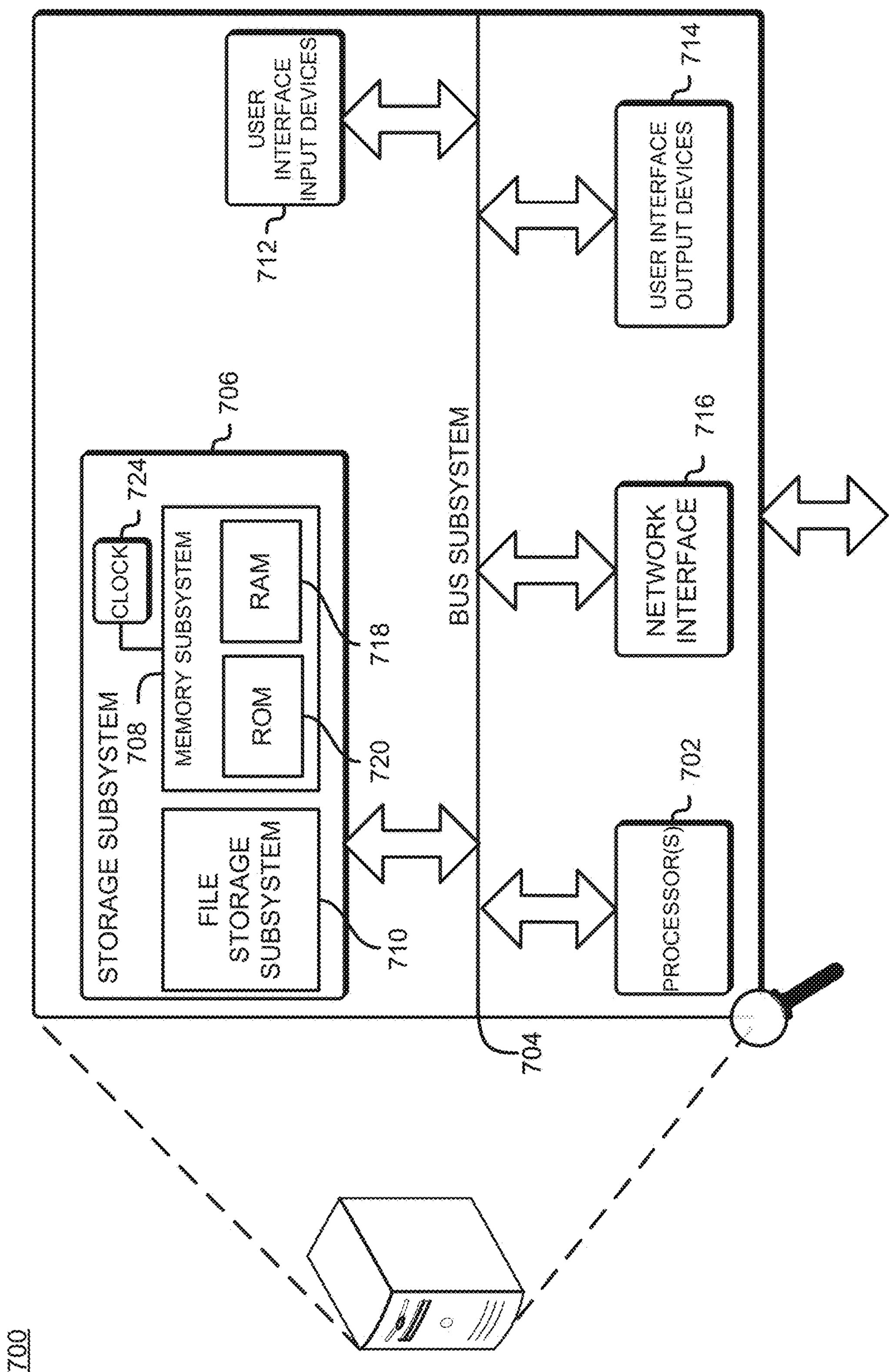
FIG. 7 illustrates a computing device that may be used in accordance with at least one embodiment/an environment in which various embodiments can be implemented.

FIG. 7 is an illustrative, simplified block diagram of a computing device 700 that can be used to practice at least one embodiment of the present disclosure. In various embodiments, the computing device 700 includes any appropriate device operable to send and/or receive requests, messages, or information over an appropriate network and convey information back to a user of the device. The computing device 700 may be used to implement any of the systems illustrated and described above. For example, the computing device 700 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 700 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 7, the computing device 700 may include one or more processors 702 that, in embodiments, communicate with and are operatively coupled to a number of peripheral subsystems via a bus subsystem. In some embodiments, these peripheral subsystems include a storage subsystem 706, comprising a memory subsystem 708 and a file/disk storage subsystem 710, one or more user interface input devices 712, one or more user interface output devices 714, and a network interface subsystem 716. Such storage subsystem 706 may be used for temporary or long-term storage of information.

In some embodiments, the bus subsystem 704 may provide a mechanism for enabling the various components and subsystems of computing device 700 to communicate with each other as intended. Although the bus subsystem 704 is shown schematically as a single bus, alternative embodiments of the bus subsystem utilize multiple buses. The network interface subsystem 716 may provide an interface to other computing devices and networks. The network interface subsystem 716 may serve as an interface for receiving data from and transmitting data to other systems from the computing device 700. In some embodiments, the bus subsystem 704 is utilized for communicating data such as details, search terms, and so on. In an embodiment, the network interface subsystem 716 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 716 is enabled by wired and/or wireless connections and combinations thereof.

In some embodiments, the user interface input devices 712 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 700. In some embodiments, the one or more user interface output devices 714 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 700. The one or more user interface output devices 714 can be used, for example, to present user interfaces to facilitate user interaction with applications performing processes described and variations therein, when such interaction may be appropriate.

In some embodiments, the storage subsystem 706 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 706. These application modules or instructions can be executed by the one or more processors 702. In various embodiments, the storage subsystem 706 additionally provides a repository for storing data used in accordance with the present disclosure. In some embodiments, the storage subsystem 706 comprises a memory subsystem 708 and a file/disk storage subsystem 710.

In embodiments, the memory subsystem 708 includes a number of memories, such as a main random-access memory (RAM) 718 for storage of instructions and data during program execution and/or a read only memory (ROM) 720, in which fixed instructions can be stored. In some embodiments, the file/disk storage subsystem 710 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 700 includes at least one local clock 724. The at least one local clock 724, in some embodiments, is a counter that represents the number of ticks that have transpired from a particular starting date and, in some embodiments, is located integrally within the computing device 700. In various embodiments, the at least one local clock 724 is used to synchronize data transfers in the processors for the computing device 700 and the subsystems included therein at specific clock pulses and can be used to coordinate synchronous operations between the computing device 700 and other systems in a data center. In another embodiment, the local clock is a programmable interval timer.

The computing device 700 could be of any of a variety of types, including a portable computer device, tablet computer, a workstation, or any other device described below. Additionally, the computing device 700 can include another device that, in some embodiments, can be connected to the computing device 700 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 700 for processing. Due to the ever-changing nature of computers and networks, the description of the computing device 700 depicted in FIG. 7 is intended only as a specific example for purposes of illustrating the preferred embodiment of the device. Many other configurations having more or fewer components than the system depicted in FIG. 7 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 700 may include any appropriate hardware, software, and firmware for integrating with a data store as needed to execute aspects of one or more applications for the computing device 700 to manage some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 700 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 700 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 700 may provide the content in one or more forms including, but not limited to, forms that are perceptible to the user audibly, visually, and/or through other senses. The handling of requests and responses, as well as the delivery of content, in an embodiment, is managed by the computing device 700 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 700 typically will include an operating system that provides executable program instructions for the general administration and operation of the computing device 700 and includes a computer-readable storage medium (e.g., a hard disk, random access memory (RAM), read only memory (ROM), etc.) storing instructions that if executed (e.g., as a result of being executed) by a processor of the computing device 700 cause or otherwise allow the computing device 700 to perform its intended functions (e.g., the functions are performed as a result of one or more processors of the computing device 700 executing instructions stored on a computer-readable storage medium).

In an embodiment, the computing device 700 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 700 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 700 is capable of storing, retrieving, and accessing structured or unstructured data. In an embodiment, computing device 700 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

At least one embodiment of the disclosure can be described in view of the following clauses:

1. A computer-implemented method, comprising:
receiving data corresponding to a plurality of entities;
identifying a set of features of the plurality of entities based, at least in part, on the data;
categorizing the plurality of entities into a plurality of segments based, at least in part, on the set of features;
grouping the plurality of segments into a plurality of groups based, at least in part, on similarities between segments of the plurality of segments;
training a machine learning model by at least initializing a weight to an individual segment of the plurality of segments and modifying the weight in an iterative training process to compute group performance metrics for the plurality of groups;
using the trained machine learning model to compute a first group performance metric for a first group of the plurality of groups;
allocating a first resource to the first group of the plurality of groups based, at least in part, on the first group performance metric;
presenting, via a user interface, indication of the first resource allocated to the first group and a second resource allocated to a second group of the plurality of groups; and
re-categorizing the plurality of entities and using the trained machine learning model to re-compute group performance metrics based, at least in part, on changed data; and
re-allocating the first resource based, at least in part, on the re-categorization of the plurality of entities.

2. The computer-implemented method of clause 1, wherein re-allocating the first resource further comprises:
using the trained machine learning model to compute a second group performance metric for a third group generated based, at least in part, on the re-categorization of the plurality of entities; and
allocating the first resource or a third resource to the third group generated based, at least in part, on the second group performance metric.

3. The computer-implemented method of clause 1 or 2, wherein the weight is initialized equally for the plurality of segments before execution of the iterative training process to train the machine learning model.

4. The computer-implemented method of any of clauses 1-3, wherein training the machine learning model further comprises receiving additional data in batches for modification of the weight in the iterative training process.

5. A system, comprising:
one or more processors; and
one or more non-transitory, computer-readable media comprising executable instructions recorded thereon that, as a result of execution by the one or more processors, cause the system to at least:
categorize a plurality of entities into a plurality of segments based, at least in part, on data corresponding to the plurality of entities;
generate a plurality of groups based, at least in part, on similarities between segments of the plurality of segments;
train a machine learning model that computes group performance metrics for the plurality of groups by at least initializing a weight to an individual segment of the plurality of segments and modifying the weight;
allocate a first resource to a first group of the plurality of groups based, at least in part, on a first group performance metric from the trained machine learning model; and
cause an indication of the first resource allocated to the first group to be presented via an interface.

6. The system of clause 5, wherein the executable instructions further include instructions that further cause the system to:
re-categorize the plurality of entities and cause the trained machine learning model to re-compute group performance metrics based, at least in part, on additional data or a change in the data.

7. The system of clause 6, wherein the executable instructions that cause the system to cause the trained machine learning model to re-compute group performance metrics further include instructions that further cause the system to:
integrate a group to the plurality of groups based, at least in part, on the re-categorization of the plurality of entities; and
use the trained machine learning model to compute a second group performance metric for the integrated group.

8. The system of claim 6 or 7, wherein the executable instructions further include instructions that further cause the system to:
allocate a second resource to the first group of the plurality of groups based, at least in part, on the re-computation of the group performance metrics from the trained machine learning model.

9. The system of any of clauses 5-8, wherein the executable instructions that cause the system to train the machine learning model further include instructions that further cause the system to:

perform a regression algorithm as part of the modification of the weight.

10. The system of any of clauses 5-9, wherein the executable instructions that cause the system to receive the data on a plurality of entities further include instructions that further cause the system to:

receive the data in batches each associated with a time period.

11. The system of any of clauses 5-10, wherein the executable instructions to re-categorize the plurality of entities further include instructions that further cause the system to remove at least one of the plurality of entities from at least one of the plurality of segments based, at least in part, on a determination that the at least one of the plurality of entities is an anomaly.

12. The system of any of clauses 5-11, wherein the indication is presented in response to a signal from a device associated with at least one of the plurality of entities.

13. One or more non-transitory computer-readable storage media having stored thereon computer-executable instructions that, as a result of being executed by one or more processors of a computer system, cause the computer system to at least:

categorize a plurality of entities into a plurality of segments based, at least in part, on data of the plurality of entities;

generate a plurality of groups based, at least in part, on similarities between segments of the plurality of segments;

train a machine learning model that computes group performance metrics for the plurality of groups by at least initializing a weight to an individual segment of the plurality of segments and modifying the weight;

allocate a first resource to a first group of the plurality of groups based, at least in part, on a first group performance metric from the trained machine learning model;

cause an indication of the first resource allocated to the first group to be provided to an interface; and re-categorize the plurality of entities and cause the trained machine learning model to re-compute group performance metrics based, at least in part, on additional data or a change in the data.

14. The one or more non-transitory computer-readable storage media of clause 13, wherein the computer-executable instructions further include executable instructions that further cause the computer system to:

identify a third group of the plurality of groups that is generated as a result of re-categorizing the plurality of entities; and allocating the first resource or a third resource to the third group of the plurality of groups based, at least in part, on re-computation of the group performance metrics.

15. The one or more non-transitory computer-readable storage media of clause 13 or 14, wherein the trained machine learning model is further trained based, at least in part, on the additional data or the change in the data.

16. The one or more non-transitory computer-readable storage media of any of clauses 13-15, wherein the indication is provided to a device associated with at least one of the plurality of entities in response to a signal from the device.

17. The one or more non-transitory computer-readable storage media of any of clauses 13-16, wherein the first group performance metric comprises a score associated with the first group of the plurality of groups.

18. The one or more non-transitory computer-readable storage media of any of clauses 13-17, wherein the computer-executable instructions to cause the computer system to train a machine learning model further include executable instructions that further cause the computer system to:

perform a regression algorithm as part of the modifying of the weight.

19. The one or more non-transitory computer-readable storage media of any of clauses 13-18, wherein the computer-executable instructions to cause the computer system to train the machine learning model further include executable instructions that further cause the computer system to:

identify that an initial value for the weight is identical for the plurality of segments prior to performing an iterative training process to train the machine learning model comprising a neural network.

20. The one or more non-transitory computer-readable storage media of any of clauses 13-19, wherein the computer-executable instructions to cause the computer system to train the machine learning model further include executable instructions that further cause the computer system to:

receive additional data in sequential batches as part of the modifying of the weight.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:

receiving data corresponding to a plurality of entities;

identifying a set of features of the plurality of entities based, at least in part, on the data;

categorizing the plurality of entities into a plurality of segments based, at least in part, on the set of features;

grouping the plurality of segments into a plurality of groups based, at least in part, on similarities between segments of the plurality of segments;

training a machine learning model by at least initializing a weight to an individual segment of the plurality of segments and modifying the weight in an iterative training process to compute group performance metrics for the plurality of groups;

using the trained machine learning model to compute a first group performance metric for a first group of the plurality of groups;

allocating a first resource to the first group of the plurality of groups based, at least in part, on the first group performance metric;

presenting, via a user interface, indication of the first resource allocated to the first group and a second resource allocated to a second group of the plurality of groups; and re-categorizing the plurality of entities and using the trained machine learning model to re-compute the group performance metrics based, at least in part, on changed data; and re-allocating the first resource based, at least in part, on the re-categorization of the plurality of entities.

2. The computer-implemented method of claim 1, wherein re-allocating the first resource further comprises:

using the trained machine learning model to compute a second group performance metric for a third group generated based, at least in part, on the re-categorization of the plurality of entities; and allocating the first resource or a third resource to the third group generated based, at least in part, on the second group performance metric.

3. The computer-implemented method of claim 1, wherein the weight is initialized equally for the plurality of segments before execution of the iterative training process to train the machine learning model.

4. The computer-implemented method of claim 1, wherein training the machine learning model further comprises receiving additional data in batches for modification of the weight in the iterative training process.

5. A system, comprising:

one or more processors; and one or more non-transitory, computer-readable media comprising executable instructions recorded thereon that, as a result of execution by the one or more processors, cause the system to at least:

categorize a plurality of entities into a plurality of segments based, at least in part, on data corresponding to the plurality of entities;

generate a plurality of groups based, at least in part, on similarities between segments of the plurality of segments;

train a machine learning model that computes group performance metrics for the plurality of groups by at least initializing a weight to an individual segment of the plurality of segments and modifying the weight;

allocate a first resource to a first group of the plurality of groups based, at least in part, on a first group performance metric from the trained machine learning model;

cause an indication of the first resource allocated to the first group to be presented via an interface;

re-categorize the plurality of entities and cause the trained machine learning model to re-compute the group performance metrics based, at least in part, on additional data or a change in the data; and re-allocate the first resource based, at least in part, on the re-categorization of the plurality of entities.

6. The system of claim 5, wherein the initializing the weight comprises setting up a same value for the plurality of segments.

7. The system of claim 5, wherein the executable instructions that cause the system to cause the trained machine learning model to re-compute group performance metrics further include instructions that further cause the system to:

integrate a group to the plurality of groups based, at least in part, on the re-categorization of the plurality of entities; and use the trained machine learning model to compute a second group performance metric for the integrated group.

8. The system of claim 5, wherein the executable instructions further include instructions that further cause the system to:

allocate a second resource to the first group of the plurality of groups based, at least in part, on the re-computation of the group performance metrics from the trained machine learning model.

9. The system of claim 5, wherein the executable instructions that cause the system to train the machine learning model further include instructions that further cause the system to:

perform a regression algorithm as part of the modification of the weight.

10. The system of claim 5, wherein the executable instructions that cause the system to receive the data on a plurality of entities further include instructions that further cause the system to:

receive the data in batches each associated with a time period.

11. The system of claim 5, wherein the executable instructions to re-categorize the plurality of entities further include instructions that further cause the system to remove at least one of the plurality of entities from at least one of the plurality of segments based, at least in part, on a determination that the at least one of the plurality of entities is an anomaly.

12. The system of claim 5, wherein the indication is presented in response to a signal from a device associated with at least one of the plurality of entities.

13. One or more non-transitory computer-readable storage media having stored thereon computer-executable instructions that, as a result of being executed by one or more processors of a computer system, cause the computer system to at least:

categorize a plurality of entities into a plurality of segments based, at least in part, on data of the plurality of entities;

generate a plurality of groups based, at least in part, on similarities between segments of the plurality of segments;

train a machine learning model that computes group performance metrics for the plurality of groups by at least initializing a weight to an individual segment of the plurality of segments and modifying the weight;

allocate a first resource to a first group of the plurality of groups based, at least in part, on a first group performance metric from the trained machine learning model;

cause an indication of the first resource allocated to the first group to be provided to an interface;

re-categorize the plurality of entities and cause the trained machine learning model to re-compute the group performance metrics based, at least in part, on additional data or a change in the data; and re-allocate the first resource based, at least in part, on the re-categorization of the plurality of entities.

14. The one or more non-transitory computer-readable storage media of claim 13, wherein the computer-executable instructions further include executable instructions that further cause the computer system to:

identify a third group of the plurality of groups that is generated as a result of re-categorizing the plurality of entities; and allocating the first resource or a third resource to the third group of the plurality of groups based, at least in part, on re-computation of the group performance metrics.

15. The one or more non-transitory computer-readable storage media of claim 13, wherein the trained machine learning model is further trained based, at least in part, on the additional data or the change in the data.

16. The one or more non-transitory computer-readable storage media of claim 13, wherein the indication is provided to a device associated with at least one of the plurality of entities in response to a signal from the device.

17. The one or more non-transitory computer-readable storage media of claim 13, wherein the first group performance metric comprises a score associated with the first group of the plurality of groups.

18. The one or more non-transitory computer-readable storage media of claim 13, wherein the computer-executable instructions to cause the computer system to train a machine learning model further include executable instructions that further cause the computer system to:

perform a regression algorithm as part of the modifying of the weight.

19. The one or more non-transitory computer-readable storage media of claim 13, wherein the computer-executable instructions to cause the computer system to train the machine learning model further include executable instructions that further cause the computer system to:

identify that an initial value for the weight is identical for the plurality of segments prior to performing an iterative training process to train the machine learning model comprising a neural network.

20. The one or more non-transitory computer-readable storage media of claim 13, wherein the computer-executable instructions to cause the computer system to train the machine learning model further include executable instructions that further cause the computer system to:

receive additional data in sequential batches as part of the modifying of the weight.

* * * * *